July 14, 1970 H. M. HUFFMAN ET AL 3,520,385
DISC BRAKE WITH TORSION SPRING OPERATED, SELF-ADJUSTING MEANS
Filed Nov. 1, 1968 2 Sheets-Sheet 1

INVENTORS
HERMAN M. HUFFMAN
JOHN A. BECKMAN
BY Townsend and Townsend
ATTORNEYS

United States Patent Office 3,520,385
Patented July 14, 1970

3,520,385
DISC BRAKE WITH TORSION SPRING OPERATED, SELF-ADJUSTING MEANS
Herman M. Huffman and John A. Beckman, Owosso, Mich., assignors to Midland-Ross Corporation, Cleveland, Ohio, a corporation of Ohio
Filed Nov. 1, 1968, Ser. No. 772,783
Int. Cl. B60l 11/20
U.S. Cl. 188—152           11 Claims

ABSTRACT OF THE DISCLOSURE

Apparatus for a hydraulic power and manual or split manual brake system for an automobile including a conventional drop-center type rim and wheel assembly to which is connected a disc for rotation with the wheel assembly, said disc having opposite friction surfaces. A caliper or transfer member straddles a portion of the periphery of the disc and carries friction pads for engagement with the opposite friction surfaces of the disc. The caliper is floatingly carried on a fixed support for movement normal to the plane of the disc. A self-adjusting brake actuator means is provided in the caliper for continuously maintaining both of the friction pads in contact with the surfaces of the disc and for forcing said pads against the disc during brake-applied conditions. The actuator means is responsive either to a primary power source or to a secondary manual source of hydraulic fluid. The adjustment of the actuator means is performed by a low-torque expansion mechanism including a threaded assembly which is unscrewed by a wound torsion spring at a rate sufficient to compensate for wear of the pads, thereby to maintain both of the pads continuously in contact with the disc. To aid in cooling of the actuator and related parts, air cooling fins are provided on one of the actuator pistons forming a part of the actuator means.

BACKGROUND OF THE INVENTION

The present invention relates to hydraulic brake apparatus for motor vehicles, and more particularly to caliper-type disc brakes having friction pads in contact with opposite surfaces of a rotatable disc assembly.

Optimum performance of a disc brake is realized if the pads are in contact with the disc at the time of application of hydraulic power to the brake so that the pads will exert equal forces on the rotating disc. It is recognized that conditions may occur resulting in the wear of one pad being greater than that of the other, or other conditions may arise from which the dimensions of one or both pads are changed. Therefore, to continue to realize optimum performance, it has been discovered that suitable self-adjusting means are necessary for continuously maintaining the pads, during unapplied brake conditions, in equal contact with the friction pads of the rotating disc. Not only must such adjustment be made to realize the best results, but it is highly desirable that the magnitude of forces exerted against the disc during unapplied brake conditions be of uniformly the same low value and within allowable limits so as to avoid undesirable heating problems, and to the extent that heating occurs suitable cooling means are necessary.

The self-adjustment apparatus must function properly not only during normal driving conditions of the motor vehicle, but it is desirable that such self-adjustment apparatus be of a character so that the friction pads may be replaced or other services rendered without altering the normal setting or functioning of the self-adjustment apparatus, and if such alteration is necessary, such self-adjustment mechanism can readily be reset in proper functioning position.

It has also been discovered that optimum results are realized from a self-adjusting caliper-type disc brake if the caliper not only is maintained with the friction pads centered on the disc but also so that the strokes of the hydraulically actuated members of the actuator mechanism are maintained at a minimum, both for the primary power system and the secondary manual system.

SUMMARY OF THE INVENTION

According to one form of the present invention a caliper-type disc brake is provided having a rotatable disc, a caliper straddling a portion of the periphery of the disc, friction pads mounted in the caliper in engagement with opposite sides of the rotatable disc, one of said pads being connected to one end of said caliper for movement therewith, the other of said pads being mounted in said caliper for movement relative thereto, support means floatingly carrying said caliper for movement normal to the plane of said disc, and a self-adjusting brake actuator means supported in said caliper for urging said friction pads during applied brake conditions uniformly against said disc into braking engagement therewith. The actuator means includes a cylinder and a piston displaceable from one end of the caliper and connected to the friction pad which is movable relative to the caliper for relatively moving such pad. In this arrangement the pads are urged equally into braking engagement with the disc as an incident to the displacement of the piston relative to the caliper.

A self-adjustment mechanism forms a part of the actuator means and is positioned between the piston and the caliper for moving the piston relative to the caliper so as to move the friction pads together to compensate for wear thereof. In a preferred form of the invention the self-adjustment mechanism comprises a plunger threadedly connected to the piston and a torsion spring axially aligned with the thread means and having one end operatively connected to the thread means and the other end in a fixed position relative to the caliper so that when wound, said spring will apply a torque to the thread means to unscrew the same to the extent necessary to axially displace the piston from the caliper in an amount sufficient to compensate for wear of the friction pads. Also in a preferred form of the invention, the piston is adapted to be moved for braking purposes by means of a source of hydraulic fluid from a power circuit, and a secondary piston is also positioned in the cylinder to provide actuation of the primary piston in the event of loss of pressure in the power circuit. An improved cooling arrangement for the brake is also provided by means of air cooling fins forming an integral part of the primary piston, such fins being positioned in the air stream moving over the brake during normal driving conditions of the vehicle on which the disc brake is mounted.

Accordingly, it is an object of the present invention to provide an improved disc brake which is constructed and arranged whereby it is self-adjusting so that the friction pads apply constant lateral forces on the disc during the unapplied brake conditions regardless of the wear status of the pads.

Other objects of the invention are to provide an improved disc brake of the foregoing character which will effect wheel braking with minimal displacement of the hydraulically actuated mechanism; to provide such a brake which readily centers the pads on the rotatable disc; to provide such a brake which will permit servicing or replacement of the pads without alteration of the normal working of the self-adjustment mechanism; and to provide such a brake having improved cooling characteristics.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Figure 1:
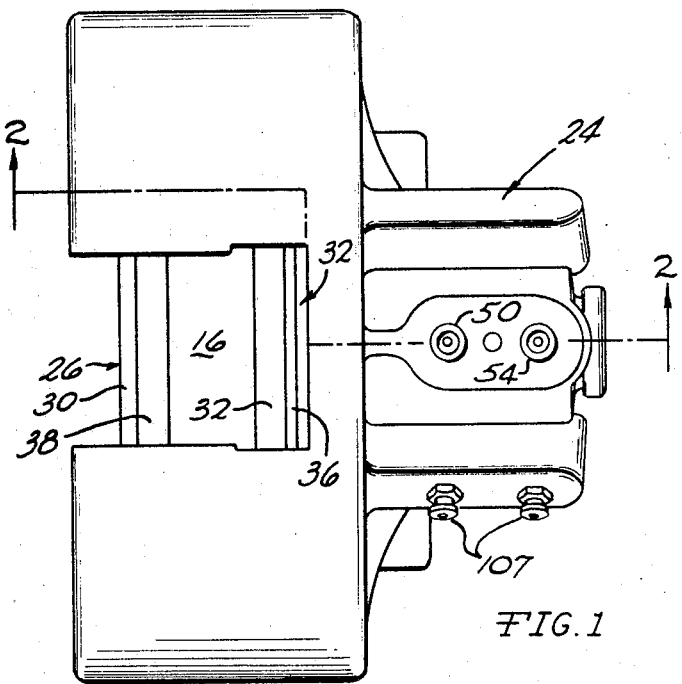
FIG. 1 is a top plan view of the caliper or transfer member of a disc brake embodying the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. As shown best in FIG. 2, the caliper-type disc brake 10 is mounted on the conventional wheel member 12 and the fixed support 14 of the motor vehicle (not shown). The disc brake 10 includes the disc 16 mounted by wheel bolts 18 to the wheel assembly 12 for rotation with the wheel assembly, and the disc 16 has outer and inner friction surfaces 20 and 22. Mounted on the fixed support 14 in floating relationship thereto for movement in a direction normal to the disc 16 is the caliper or transfer member 24. The latter straddles the outer periphery of the disc 16 and has secured to its outer end the friction pad 26. The latter includes the pad portion 28 and the support member 30 which is held in place by means of the screws 31. Also yieldably supported on the caliper or transfer member 24 is the inner friction pad 32 which includes the pad portion 34 and the support member 36. In the normal operation of the disc brake, the friction pads 26 and 32 will be in contact with the friction surfaces 20 and 22 of the disc 16 during unapplied brake conditions, and as will be described presently, when braking action is to be applied to the wheel assembly 12, the friction pads 26 and 32 will be forced together clampingly engaging the disc 16.

Figure 2:
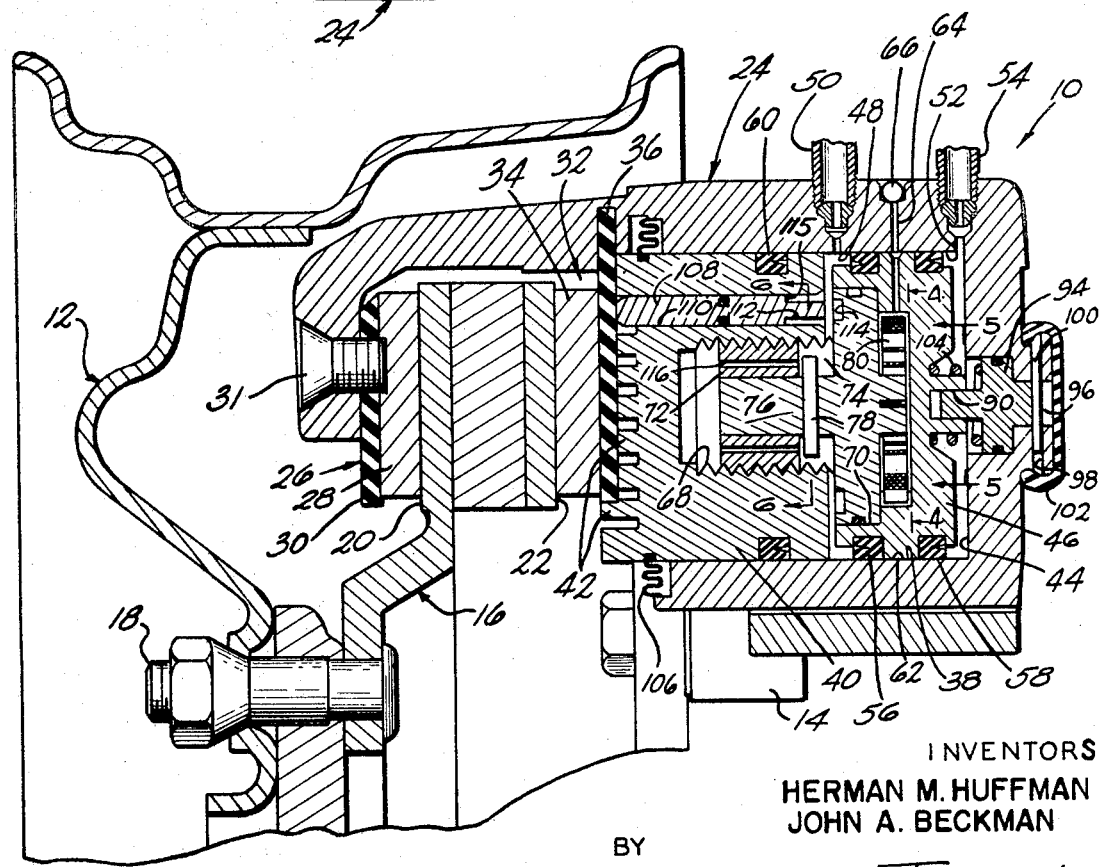
FIG. 2 is a vertical section, taken on the line 2—2 of FIG. 1, showing the disc brake mounted on a conventional wheel assembly.
Figure 3:
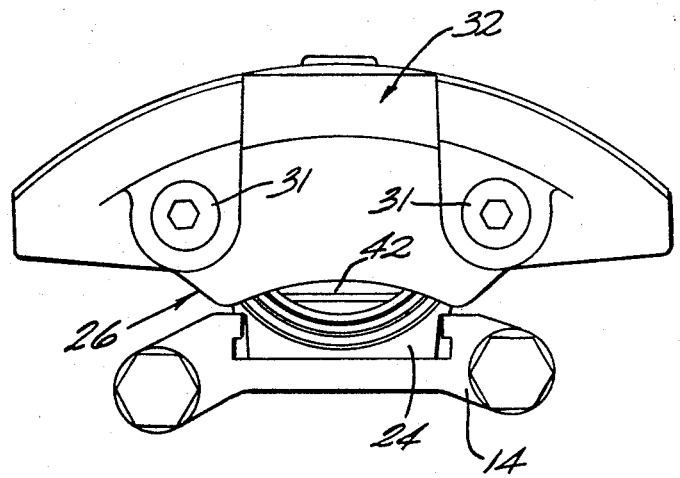
FIG. 3 is a side elevational view taken from the left of FIG. 1.
Figure 4:
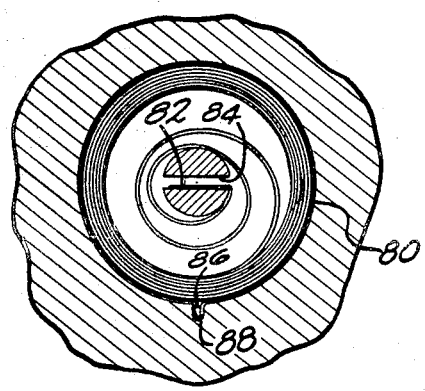
FIG. 4, 5 and 6 are fragmentary sections taken respectively on the lines 4—4, 5—5 and 6—6 of FIG. 2, illustrating details of the actuator mechanism of the disc brake.
Figure 5:
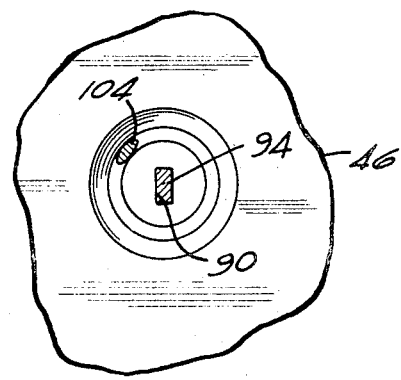
Figure 6:
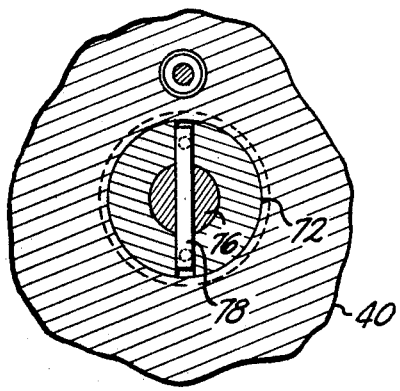

The caliper or transfer member 24 defines in its one end the cylinder 38 in which is contained the actuator mechanism for the disc brake. The actuator mechanism includes the primary or power piston or member 40 which is constructed and arranged so that it is limited normally to axial movement. Rotational movement about its axis is prevented by virtue of the construction of the piston 40 at its end adjacent to the friction pad 32. As shown in FIGS. 2 and 3, the piston 40 has a plurality of parallel, spaced, air-cooling fins 42 which are in generally horizontal planes. A portion of the ends of these fins 42 are recessed so as to receive therein the supporting member 36 of the friction pad 32, thereby restricting the piston to movement in an axial direction. It is to be understood that the pad 32 and its supporting member 36 are sufficiently flexible to permit displacement in a direction normal to the surface of the disc 16. Thus, it can be seen that the support member 36 restrains the piston 40 from turning about its axis, and in addition, it will be observed that air-cooling fins are positioned in a horizontal direction across the face of the piston 40 to permit passage of air for cooling purposes during movement of the motor vehicle.

Positioned between the inner end 44 of the caliper or transfer member 24 and the primary piston 40 is a secondary piston 46. The two pistons 40 and 46 define between then an annular pressure chamber 48 which is in communication with the conduit 50 for supplying pressurized hydraulic fluid from the power brake system of the motor vehicle. When the secondary piston 46 is retained in a fixed position, introduction of fluid under pressure into the pressure chamber 48 will have the effect of urging the primary piston 40 to the left into braking engagement position.

The secondary piston 46 also defines with the end 44 of the caliper or transfer member 24 a second pressure chamber 52 which is in communication with the conduit 54 for receiving hydraulic fluid under pressure from the secondary or manually operated brake system. The secondary system normally will not function except upon failure of pressure in the primary system, as will be described presently. Thus, it can be seen that when the power system is in operation and pressurized fluid is introduced into chamber 48 to move the piston 40 to the left, an equal and opposite force will be transmitted through the secondary piston 46 and against the end 44 of the caliper or transfer member 24 so that the pad 26 will be urged to the right by a force equal and opposite to the force urging the pad 32 to the left, as viewed in FIG. 2. It should be noted that piston 46 can rest directly against the end wall 44. However the chamber 52 will not pressurize directly as a result of pressure in chamber 48 but will or can be pressurized from its own source. Moreover, the secondary system can be either a manual source or power source, i.e., either system can have a power source or manual source or any combination thereof.

In the event there should be a failure or leakage in the manual or secondary system, the loss of fluid in this system normally will not impair the operation of the power portions of the disc brake 10. Under these circumstnaces, there will be no fluid pressure in chamber 52, and consequently when pressurized fluid is introduced into chamber 48, the piston 46 will move to the right to the extent permitted toward the end wall 44, and thereby, the pressure forces within the pressure chamber 48 will be transmitted to the end wall 44 in the same manner as if fluid for the manual system were trapped in pressure chamber 52. The secondary braking system will also function in the event of a loss of pressure or failure to the primary braking system. If there is a loss of pressure in the primary system, fluid pressure will be introduced into chamber 52 via the conduit 54, and this pressurized fluid will urge the secondary piston 46 against the primary piston 40 with a force equal to that which is exerted against the end wall 44 of the caliper 24 thereby effecting the braking action of the pads 26 and 32 on the disc 16.

In order to prevent transfer of fluid between the pressure chambers 48 and 52, conventional seals 56 and 58 are provided around the periphery of the secondary piston 56. Similarly, to prevent leakage of fluid from the pressure chamber 48 to the other or open end of the cylinder 38, a conventional seal 60 is provided around the periphery of the piston 40. In order to provide a means for detecting a leak, should it occur, between the chambers 48 and 52, an annular groove 62 is provided around the periphery of the piston 56 between the seals 56 and 58, and a radial passage 64 is provided from the groove 62 to the outer periphery of the caliper or transfer member 24 to permit leakage. A ball 66 is positioned in the outer end of the passage 64 to prevent dust or other undesirable elements from entering the passageway 64. By virtue of this arrangement, leakage between the two chambers 48 and 52 can be detected by visual observation of oil leakage around the ball 66.

The self-adjustment mechanism of the disc brake will now be described. As best shown in FIGS. 2, 4, 5 and 6, the primary piston 40 contains a threaded bore 68 which opens in the direction of the secondary piston 46. The secondary piston 46 also defines a bore 70 which opens in the direction of the primary piston 40. Threadedly connected in the bore 68 is the annular screw 72 which has a slot 74 in its open end. Extending into the opening in the annular screw 72 is a plunger 76 which has a transverse opening in which a pin 78 is positioned. By virtue of this arrangement, the plunger 76 and annular screw 72 can move axially relative to each other but rotate as a unit only when the plunger 76 is turned.

Also positioned in the bore 70 in piston 46 is a torsion spring 80 which has its one end 82 fitted into a slot 84 in the end of plunger 76 and its other end 86 fitted into a slot 88 in the secondary piston 46. Thus, turning of the piston 46 relative to the plunger 76 will have the effect of winding the torsion spring 80 so that the stored energy in the spring 80 can be utilized to apply a torque to the plunger 76 for a purpose to be described.

As was previously described, the piston 40 is restrained against rotation about its own axis by the locking action of the support member 36 relative to the fins 42. The secondary piston 46 is also provided with means for locking it against rotational movement about its axis after the torsion spring 80 has been wound to the desired extent necessary to apply a torque to the plunger 76. One end of the piston 46 defines a rectangular bore 90. A plug 94 is adapted to fit in the end of the caliper or transfer member 24, and the plug 94 has a rectangular configuration at its inner end adapted to be fitted into the bore 90 so that relative rotation between the plug 94 and the piston 46 is prevented, so long as the plug 94 is inserted into the bore 90. The outer end of the plug 94 is provided with a screwdriver slot 96 to allow turning of the plug about its axis, and when this is done, the piston 46 will be rotated about its axis. The outer end of the caliper or transfer member 24 has a transverse bore 98 in which a pin 100 may be inserted for locking the plug 94 against such rotational movement.

From the foregoing description it will be understood that when it is desired to wind the torsion spring 80 so that its stored energy will be effective to apply a limited torque to the plunger 76 urging it to turn the annular screw 72 relative to the piston 40, this can be accomplished merely by removing the pin 100 from the transverse duct 98 and then turning the plug 94 by means of a screwdriver, and this turning action will be transmitted to the piston 46 to cause winding of the spring 80.

When the spring is fully wound, the transverse duct or passageway 98 can be aligned with the screwdriver slot 96 and the pin 100 can be dropped in place. Thereafter, the boot seal 102 can be positioned in place to provide a safeguard against dust or other impurities entering the end of the caliper or transfer member 24. A compression spring 104 is positioned between the secondary piston 46 and the plug 94 to maintain the plug 94 in its properly seated position in the end of the caliper or transfer member 24. As described before, if the secondary piston 46 rests against the end wall 44, the spring 104 could be eliminated, if desired.

From the above description, it is to be understood that when the torsion spring 80 is in a wound condition its stored energy will be constantly available to unscrew the annular screw 72 from the piston 40, and this will have the effect of axially displacing the piston 40 from the end 44 of the caliper or transfer member 24. The displacement will be transmitted to the pads 26 and 32 to move them into contact with the disc 16 and further displacement of this nature will be prevented so long as such contact is maintained.

Also provided as a seal to prevent material from entering the interior of the cylinder 38 is the boot seal 106 which is operatively positioned between the periphery of the piston 40 and the opposite end of the cylinder 48. The caliper or transfer member also contains conventional bleeder screws 107, FIG. 1, which are adapted for use in bleeding pressure chambers 48 and 52.

The self-adjusting brake actuator mechanism is also provided with structure to prevent the screw 72 from being unscrewed during operations, such as replacing the friction pads 26 and 32, and the like. If it is desired to retain the annular screw 72 in its established position with respect to piston 40, this can be accomplished by utilizing the plug 108 which is located in the bore 110 extending through piston 40, parallel to the axis thereof. The plug 108 has a projection of reduced diameter at its end 112 which is adapted to fit in mating relationship into any of a series of sockets 114 in the plunger 76. By virtue of this arrangement, when it is desired to remove the friction pad 32, this can be done and the plug 108 can be manually moved axially through the pressure chamber 48 into one of the sockets 114, and this will have the effect of locking the primary piston 40 against rotation relative to the plunger 76. When so locked together, the annular screw 72 cannot be moved axially with respect to the primary piston 40 so that the axial relationship between the various elements in the cylinder 48 can be maintained during the time that the servicing operations are performed. As soon as the parts are re-assembled and the friction pad 32 has been fitted in place so that the primary piston 40 no longer can rotate about its axis, fluid pressure from the power system can be introduced into the pressure chamber 48 as an incident to applying the brake, and this will have the effect of displacing the plug 108 from its locked position with respect to plunger 76, by virtue of the fluid pressure acting on the annular surface 115 of the plug 108. This will restore the plunger to the position shown in FIG. 2.

From the foregoing description it will be understood that the self-adjusting mechanism comprises a torsion spring 80 operatively connected to a threaded assembly which is arranged so that it will constantly urge the threaded assembly to unscrew itself so as to axially displace the primary piston 40 from the end 44 to the caliper or transfer member 24 when no pressure is present in cavity 48 between piston 40 and piston 46. The annular seal contained on plunger 76 sealing on bore surface 70, grips the wall defining the bore 70 when pressure is present in the cavity 48, thereby preventing adjustment during a brake application. This is important in the event of a secondary system failure and extremely high pressure present in cavity 48, as the piston 46 will be in mechanical contact with the wall 44, the caliper arms of the body 24 will deflect under the force, and if full adjustment is made, taking up the gap created by rearward movement of the piston 46 to the wall 44 and forward movement of the piston 40 due to the caliper arm deflection, when the brake pedal is released and pressure drops in cavity 48, the brakes would remain substantially applied. The forces tending to displace these parts are transmitted through the screw assembly and the secondary piston 46 to the end wall 44. During such movement the annular threaded member 72 will unscrew itself partially from the threaded bore 68, and to compensate for the vacuum which otherwise would be created in the inner end of the bore 68, a pair of ducts 116 are provided to permit hydraulic fluid to flow into the inner end of the bore 68.

In the pad replacement operation, the steps that are taken are generally as follows. Initially, the boot 102 and pin 100 are removed which allows the torsion spring 180 to unwind completely so that no adjustment is made during pad removal. Next the screws 31 are removed and the disc pad support 30 and the pad 28 are withdrawn. The caliper or transfer member 24 is then moved on its mounting 14 toward the disc 16 until it engages the same so as to space the other pad 32 from the disc 16. Thereafter, the friction pad 32 is removed and any suitable tool such as a screwdriver is placed in the slot 96 of the plug 94, and while grasping the primary piston 40, is turned in a clockwise direction and this is continued until the primary piston bottoms against the secondary piston 48. The plug 108 is then pushed inwardly and the plug 94 can be turned in a counterclockwise direction to the extent necessary to permit the plug 108 to seat in one of the pockets 114.

Thereafter, the parts can be re-assembled by replacing the friction pad 32 and the caliper or transfer member 24 can then be moved in the opposite direction so that the pad 32 again abuts against the disc 16. Thereafter, the friction pad 26 can be re-inserted in place.

The operation of rewinding the torsion spring can then be performed by rotating the plug 94 in a counterclockwise direction to wind the spring until an increase in torque is noticed. The plug 94 is then turned in a clockwise direction about one to one and one half turns to enable insertion of the pin 100 in the plug 94, and thereafter the boot 102 can be inserted in place. Upon the first brake application, fluid enters the pressure chamber 48 from conduit 50 and creates a force upon the effective areas of the plug 108 to move the same into abutment with the support member 36, thereby releasing the plunger 76 so that the latter can rotate relative to the primary piston 40.

Thereafter, during the normal operation of the self-adjusting mechanism, when wear or other conditions occur which otherwise might result in spacing of one of the pads or both of them from the disc 116, the torsion spring 80 which maintains a nearly constant but limited torque on the plunger 76 will cause the latter to turn the annular screw 72, thereby tending to displace axially the piston 40 from the end 44 of the caliper or transfer member 24. This will have the effect of moving the pads 26 and 32 into contact with the disc 16. Thus, at all times, the pads 26 and 32 will be maintained in contact with the disc 16 during unapplied brake conditions.

While a preferred embodiment of the invention has been shown and described, it will be understood that various changes and modifications may be made without departing from the spirit of the invention.

What is claimed is:

1. A disc brake having a rotatable disc, a caliper straddling a portion of the periphery of said disc and defining a hydraulic cylinder disposed on one side of said disc, friction pads mounted in said caliper in engagement with opposite sides of said disc, one of said pads being connected to one end of said caliper for movement therewith, the other of said pads being mounted in said caliper for movement relative thereto, support means floatingly carrying said caliper for movement normal to the plane of said disc, a self-adjusting brake actuator means supported in said caliper for urging said friction pads following applied-brake conditions more firmly against said disc into braking engagement therewith, said actuator means including a member displaceable from the other end of said caliper and connected to said other friction pad for moving said other friction pad relative to said caliper, said pads being urged equally into braking engagement with said disc as an incident to the displacement of said member relative to said other end of said caliper, a self-adjustment mechanism positioned between said member and said other end of said caliper and expansible at a controlled rate for displacing said member from said other end of said caliper so as to maintain said friction pads constantly in engagement with said disc during unapplied brake conditions irrespectively of the wear status of said pads, said self-adjustment mechanism including a threaded means aligned with the path of movement of and threadably connected to said member, torsion spring means mounted in said caliper and adapted to displace said member relative to said caliper until said pads engage said disc, means for winding said torsion spring to the desired tension, and a pressure responsive lock mechanism mounted in said caliper in operative association with said threaded means, said lock mechanism being moveable into locking engagement with said threaded means during servicing of said brake and being moveable in response to fluid pressure in said hydraulic cylinder to release said threaded means from locking engagement with said lock mechanism.

2. A disc brake according to claim 1, wherein said member includes a plurality of horizontal air-cooling fins connected to said other friction pad for moving the latter.

3. The combination as set forth in claim 1, and means including resilient means preventing actuation of said self-adjustment mechanism during a brake application.

4. A disc brake comprising a fixed support, a rotatable disc having opposite friction surfaces, first and second friction pads arranged on opposite sides of said disc, a transfer member spanning said pads and mounted floatingly on said fixed support and movable in a direction normal to said disc, said transfer member defining a hydraulic cylinder, a primary piston in said cylinder adapted to force said pads against said surfaces as an incident to movement of the piston in a direction away from one end of said cylinder, a secondary piston positioned between said primary piston and said one end of the cylinder to provide secondary braking source in the event of loss of fluid pressure to the primary piston, a first hydraulic fluid inlet means in said cylinder between said primary piston and said secondary piston for supplying fluid for moving said primary piston, a second hydraulic fluid inlet means in said cylinder between said secondary piston and said one end of the cylinder for supplying fluid for moving the secondary piston, and a self-adjusting mechanism operatively positioned between said primary piston and said one end of the cylinder for maintaining said pads in non-braking engagement with said disc during unapplied brake conditions, said mechanism including a threaded means axially aligned with said pistons and threadedly connected to one of said pistons and a torsion spring coaxially aligned with said threaded means and seated in the other piston, one end of said spring being connected to said threaded means and the other end being connected to said other piston and arranged so that when wound the spring will urge said threaded means to unscrew from said one piston until said pads are in non-braking engagement with said disc, and means to restrict said pistons to axial movement.

5. A disc brake according to claim 4, wherein the means to restrict said pistons to axial movement includes a key plug keyed to said other piston and to said cylinder, said key plug being releasable from said cylinder for the purpose of winding said torsion spring, and being adapted thereafter to be re-keyed to said cylinder to restrict said other piston again to axial movement.

6. A disc brake according to claim 4, wherein said primary piston projects from the other end of said cylinder into engagement with one of said pads, the abutting end of the piston comprising a plurality of air-cooling heat-exchange fins.

7. The combination as set forth in claim 4, and means including resilient means preventing actuation of said self-adjustment mechanism during a brake application.

8. A disc brake according to claim 4, wherein said pistons define between them a primary pressure chamber and said first hydraulic fluid means is in communication with said primary pressure chamber.

9. A disc brake according to claim 8, wherein said secondary piston and said one end of the cylinder define between them a secondary pressure chamber, and said second hydraulic fluid inlet means is in communication with the secondary pressure chamber for supplying pressurized fluid to move said pistons for braking purposes in the event of failure of fluid supply to said primary pressure chamber.

10. A disc brake according to claim 8, wherein said one piston contains a bore therein parallel to the piston axis and opening into said primary pressure chamber, and a plug is carried in said bore for axial movement therein, said threaded means including a portion for receiving the end of said plug when the plug is moved into said chamber so as to lock said threaded means against turning relative to said one piston, said plug being responsive to pressure in said pressure chamber to move into said bore and release said threaded means.

11. A disc brake according to claim 10, wherein said one piston is the primary piston, and the bore therein also opens to one of said friction pads so that when removing said one pad for servicing the brake, said plug can be moved manually into a locked position.

References Cited

UNITED STATES PATENTS

| | | | |
|---|---|---|---|
| 2,497,438 | 2/1950 | Butler | 188—152.873 |
| 3,255,851 | 6/1966 | Griesenbrock. | |
| 3,269,490 | 8/1966 | Swift. | |
| 3,378,109 | 4/1968 | Bauman. | |
| 3,410,373 | 11/1968 | Pace. | |
| 3,417,843 | 12/1968 | Trollope | 188—216 X |

FOREIGN PATENTS

| | | |
|---|---|---|
| 1,211,875 | 3/1966 | Germany. |
| 275,683 | 8/1951 | Switzerland. |

GEORGE E. A. HALVOSA, Primary Examiner

U.S. Cl. X.R.

188—196